March 20, 1962     H. W. CHRISTENSON     3,025,717
TRANSMISSION

Original Filed Dec. 9, 1955     2 Sheets—Sheet 1

INVENTOR.
Howard W. Christenson
BY
T. L. Chisholm
ATTORNEY

March 20, 1962 H. W. CHRISTENSON 3,025,717
TRANSMISSION
Original Filed Dec. 9, 1955 2 Sheets-Sheet 2

INVENTOR
Howard W. Christenson
BY
T. L. Chisholm
ATTORNEY

United States Patent Office 3,025,717
Patented Mar. 20, 1962

3,025,717
TRANSMISSION
Howard W. Christenson, Indianapolis, Ind., assignor to General Motors Corporation, Detroit, Mich., a corporation of Delaware
Continuation of application Ser. No. 552,038, Dec. 9, 1955. This application July 8, 1960, Ser. No. 42,462
29 Claims. (Cl. 74—645)

This invention relates to a multiratio transmission and more particularly to a hydraulic control system for a multiratio transmission. This is a continuation of the applicant's prior application S.N. 552,038, filed December 9, 1955, now abandoned.

In multiratio transmissions having hydraulic control systems employing hydraulic servo motors to engage and disengage clutches to effect a change in ratio, it is desirable to control the rate of engagement and/or disengagement of these hydraulic motors. By controlling the time of the engagement and/or disengagement of the hydraulic motor, the time interval of the ratio change may be controlled to provide smoother shifting. These hydraulic control systems employ a source of pressure such as a pump which is controlled by a pressure regulator valve. In order to provide smoother shifts the pressure regulator valve is regulated during the shift change period to provide a lower pressure during the ratio change interval. The flow of fluid in the ratio change line through the control valves to the clutch motors is employed as a signal to regulate the pressure supplied to the clutch motors. The main line pressure is normally maintained by the pressure regulator valve at a high lever, however, when the control valve is actuated to engage a clutch motor for a ratio change, the flow actuates controls for the pressure regulator valve to reduce the pressure in the main line. This control may also determine the rate of change of the fluid pressure to provide a fast or slow reduction in pressure or a fast or slow increase in pressure at the termination of the ratio change. In this way, the timing of the shift interval and the pressure at which the clutches are disengaged and engaged may be controlled to reduce the shock occurring during a ratio change.

An object of this invention is to provide in a multiratio transmission having a hydraulic control system, a pressure regulator for the fluid being supplied to the ratio change motors to regulate the fluid pressure to provide a smooth shift interval.

Another object of the invention is to provide in a multiratio transmission having hydraulic controls, a fluid pressure regulator for the fluid supplied to the ratio change lines to reduce the pressure during the ratio change interval.

Another object of the invention is to provide in a multiratio transmission having a hydraulic control system, a pressure regulator for the fluid which is supplied to the ratio change motors operated by the flow to the ratio change motors to reduce the pressure during the change interval in accordance with the predetermined time and to increase the pressure to the original level in the predetermined time.

Another object of the invention is to provide in a multiratio transmission having a hydraulic control system, a pressure regulator valve to control the pressure of the fluid delivered to the ratio change motor in response to the flow of fluid to the ratio change motors to provide a controlled reduction of fluid pressure at the initiation of the ratio change and a controlled increase of fluid pressure at the termination of the ratio change.

These and other objects of the invention will be apparent from the following description and drawings of the preferred embodiment of the invention:

Figure 1:
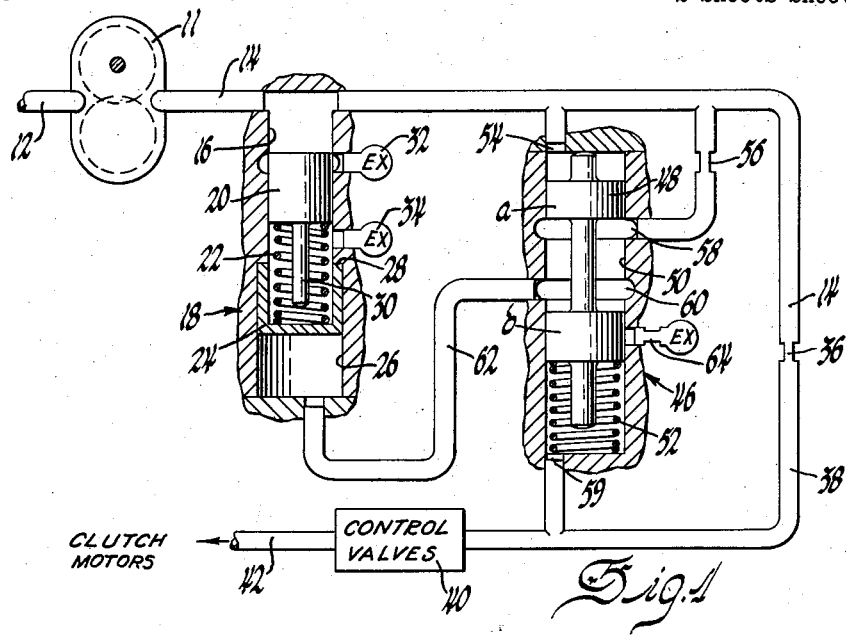
FIGURE 1 is a diagrammatic illustration of the control system.

This invention is intended to be employed with transmissions of the type providing a plurality of ratios by shifting control elements by means of the servo motors. It is particularly adapted with multiratio transmission gearing particularly of the planetary type where a plurality of ratio change hydraulic servo motors are employed to engage drive establishing or ratio change devices; such as, a connecting clutch or reaction gear brake. An example of the type of transmission is shown in the applicant's co-pending application Serial Number 396,272, filed December 4, 1953.

The hydraulic control system employs a pump 11 which draws fluid from a suitable sump (not shown) through the intake line 12 and supplies fluid under pressure to the main line 14. The main line 14 is connected through the upper end of the bore 16 of the pressure regulating valve unit 18 which has a valve member 20 reciprocally in the bore. The valve 20 is urged to the upper or closed position shown by a spring 22 which seats on the reciprocable piston 24 located in the enlarged bore 26. In the high pressure position shown in FIGURE 1 the piston 24 is in engagement with the shoulder 28 between bores 26 and 16. The stem 30 limits downward movement of the valve 20 so that it will not fully compress spring 22. In the closed position illustrated, valve 20 blocks exhaust port 32. Exhaust port 34 is open in all positions to prevent the accumulation of leakage fluid between the valve 20 and the piston 24 which would interfere with the operation of the valve. Main line 14 is connected through the valve 18 and through the orifice 36 to the ratio change line 38. Ratio change line 38 is connected through a suitable automatic or manual control valve 40 to one or more lines 42 and the ratio change motors 43. The regulator valve 18 is controlled by a control valve 46 having a spool member 48 with lands $a$ and $b$ of equal diameter located in the bore 50. The ends of the bore are closed and at the lower end a spring 52 engages the end of the bore and land $b$ to hold the valve in the upper or open position. The main line 14 is connected at port 54 to the end of the valve bore 50 to act on the end of land 48a to urge the control valve down, compressing spring 52 to close the valve. Main line 14 is also connected through orifice 56 to the port 58 located below the land $a$. Port 60 located above land $b$ is connected by line 62 to the lower end of bore 26 to act on piston 24. In the open position, land $b$ blocks the restricted exhaust 64. The ratio change line 38 is connected at port 59 to the lower end of the bore 50 to act with spring 52 upwardly on spool member 48 to open the valve.

Operation

During operation of the transmission when a ratio change is not in progress, the pump 11 supplies fluid under pressure to the main line 14 and through orifice 36 to ratio change line 38, control valves 40 and lines 42 to the servos engaged to effect the ratio in which the transmission is operating.

If the pump delivers an excess amount of fluid the pressure in main line 14 will act on valve 20 compressing spring 22 and move the valve down to the open position to permit the exhaust of the excess fluid through exhaust 32 in order to regulate the pressure in the system. The pressure will be regulated at a high value since piston 24 will be against shoulder 28 as explained below. The main line is connected through orifice 56, port 58, between the lands a and b of the spool member 48 and the line 62 to the bore 26 where the pressure acts upon the larger area of the piston 24 and holds the piston against the shoulder 28. This raises the spring abutment piston 24 against shoulder 28 requiring a higher pressure level to act upon the valve 20 before excess pressure is released by exhaust 32.

Figure 2:
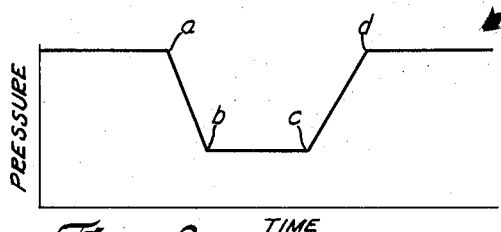
FIGURE 2 is a curve of the pressure regulation obtained with one form of the invention.

When the manual control valve 40 is actuated to provide a ratio change, flow through the main line 14 and ratio change line 38 to the motors must pass through orifice 36. Thus during the ratio change interval when there is flow in the lines, the pressure in the main line 14 is higher than the pressure in the ratio change line 38. Since the main line 14 is connected to the top of control valve 46 to act on land 48a and the ratio change pressure to the bottom of valve 46 to act on land 48b, the valve will be moved down against the force of spring 52 closing port 58 to block the flow of fluid from the main line 14 through orifice 56 and valve 46 to line 62 to act on the piston 24 and exhaust port 64 is opened to connect line 62 to the restricted exhaust 64 permitting piston 24 to move down to reduce the force exerted by spring 22. The size of the orifice or restriction in the exhaust 64 will control the time in which piston 24 recedes and thus control the rate of pressure drop from the high value to the low value. This is shown in FIGURE 2 by the slope portion a—b of the curve in FIGURE 2. The size of the orifice controls the rate of change of the main line pressure. A smaller orifice will provide a slower decrease in pressure which would be indicated by a more gradual slope of the curve portion a—b while a larger orifice will provide a faster decrease in pressure which would be indicated by a steeper slope of the curve portion a—b. Thus the orifices may be changed or a variable orifice used to change the rate of change of the pressure to meet varying requirements of the transmission.

When the flow to the ratio change motor stops, the pressure drop across orifice 36 ceases and the pressure in main line 14 and ratio control line 38 equalizes permitting the spring 52 to return the valve 48 to the open position connecting main line 14 through orifice 56 to line 62 and the bore 26. Piston 24 is thus moved upwardly to increase the pressure to the original value. The rate of increase is controlled by the orifice 56. As in the case of the restricted exhaust, the rate of feed is controlled by the orifice 56 and a certain orifice will provide a rate indicated by the portion c—d of the curve in FIGURE 2. A smaller orifice will provide a more gradual rate giving the curve portion c—d a more gentle slope while a larger orifice would provide a more rapid increase in pressure giving curve portion c—d a steeper slope.

Figure 3:
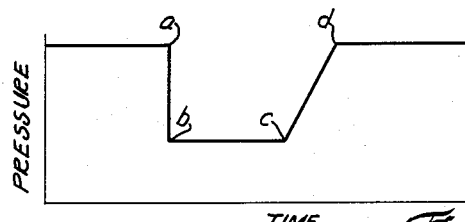
FIGURE 3 is a curve of the regulated pressure with another form of the invention.

If the restriction in the exhaust 64 is omitted, the pressure in main line 14 will drop substantially instantaneously when the ratio change is initiated as indicated in FIGURE 3 by the curve portion a—b. Then during the shift interval, the pressure will remain in the low value as indicated by the curve portion b—c. When the servo motor is filled, pressure will rise gradually as indicated by the curve portion c—d under the control of the orifice 56.

Figure 4:
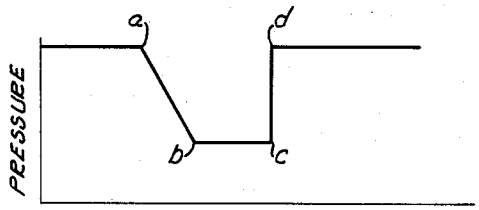
FIGURE 4 is a curve of the regulated pressure with another form of the invention.

If the orifice 56 is omitted, the pressure change will follow the curves indicated in FIGURE 4. On initiation of the ratio change, the restricted orifice 64 will slow the decrease in the pressure as indicated on a line a—b to the lower pressure b—c indicated by the curve portion. When the servo motor is filled and the valve 46 opens and connects main line 14 without restriction to the line 62, the pressure will increase substantially instantaneously to the original value as indicated by the curve portion c—d.

Figure 5:
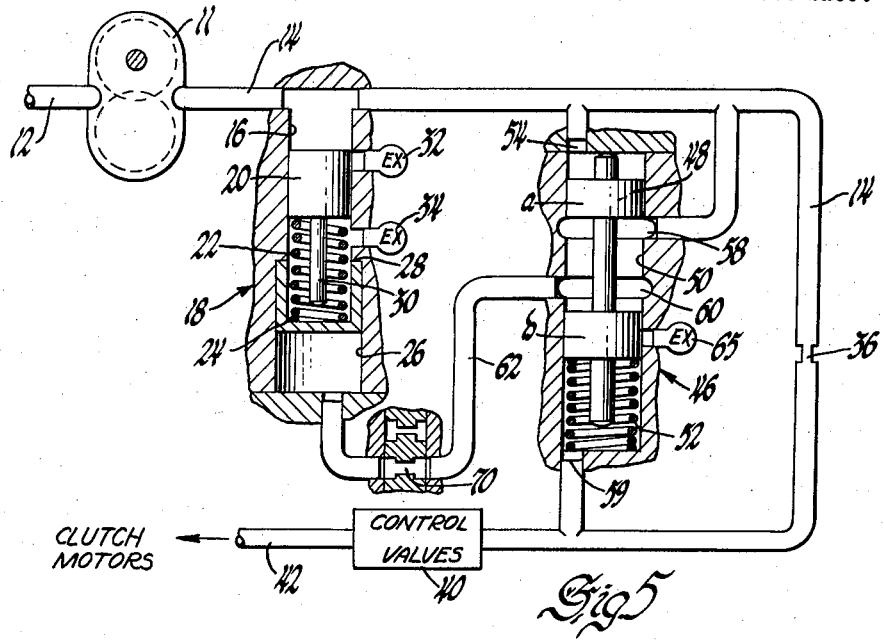
FIGURE 5 is a diagrammatic view of the modified hydraulic control system in accordance with the invention.
Figure 6:
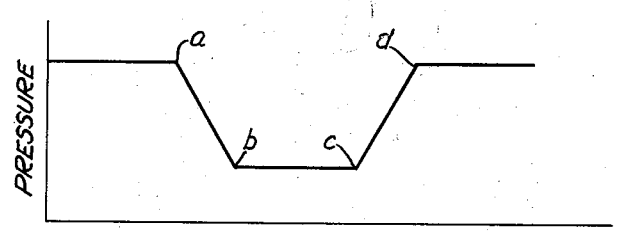
FIGURE 6 shows a curve of the pressure regulation obtained with the system of FIGURE 5.

The modification shown in FIGURE 5 is substantially like the system shown in FIGURE 1 and described above. However, it will be noted that the orifice 56 and the restricted exhaust 64 have been replaced by a free exhaust 65 and orifice 70 in the control line 62. The orifices, for example, orifice 70, may consist of a plate with a plurality of apertures to provide an adjustable orifice. This system will operate in substantially the same manner as the system of FIGURE 1 except that the orifice 70 will control the reduction in pressure upon the initiation of the shift and increase in pressure at the termination of the shift. Thus the rate of change of pressure will be the same when the pressure decreases on the initiation of the shift and when the pressure increases at the termination of the shift.

It will be apparent that the above-described preferred embodiments are illustrative of the invention which may be employed in many modified forms within the scope of the appended claims.

I claim:

1. In a transmission, a control system for a multi-ratio power train, a source of fluid under pressure, regulator valve means having a spring to control the pressure of the fluid at said source, means to vary the force of said spring to provide a regulator valve that controls the pressure of the fluid at a high pressure and at a low pressure, an orifice, ratio change control means, said source being connected through said orifice to said ratio change control means, ratio change motor means, means connecting said ratio change control means to said ratio change motor means, and means responsive to a pressure differential across said orifice caused by flow to said ratio change motor means connected to means to vary the force of said spring to control said regulator valve means to reduce the regulated pressure from said high to said low pressure.

2. In a transmission, a control system for a multiratio power train, a source of fluid under pressure, regulator valve means having a spring to control the pressure of the fluid at said source, means to vary the force of said spring to provide a regulator valve that controls the pressure of the fluid at a high pressure and at a low pressure, an orifice, ratio change control means, said source being connected through said orifice to said ratio change control means, ratio change motor means, means connecting said ratio change control means to said ratio change motor means, means responsive to a pressure differential across said orifice caused by flow to said ratio change motor means connected to means to vary the force of said spring to control said regulator valve means to change the regulated pressure between said high to said low pressure, a first timing means to control the rate of change of pressure from said high to said low pressure and a second timing means to control the rate of change of pressure from said low to said high pressure.

3. In a transmission, a control system for a multiratio power train, a source of fluid under pressure, regulator valve means having a spring to control the pressure of the fluid at said source, means to vary the force of said spring to provide a regulator valve that controls the pressure of the fluid at a high pressure and at a low pressure, an orifice, ratio change control means, said source being connected through said orifice to said ratio change control means, ratio change motor means, means connecting said ratio change control means to said ratio change motor means, means responsive to a pressure differential across said orifice caused by flow to said ratio change motor means connected to said means to vary the force of said spring to control said regulator valve means to change the regulated pressure between said high to said low pressure, and timing means to control the rate of change of pressure between said high and low pressures.

4. In a transmission, a control system for a multiratio power train, a source of fluid under pressure, regulator valve means having a spring to control the pressure of the fluid at said source, fluid motor means to vary the force of said spring to provide a regulator valve that controls the pressure of the fluid at a high pressure and at a low pressure, an orifice, ratio change control means, conduit means connecting said source through said orifice to said ratio change control means, ratio change motor means, means connecting said ratio change control means to said ratio change motor means, control valve means normally connecting said source to said fluid motor means to position said fluid motor for a spring force providing high pressure, and said control valve means having opposed areas connected to said conduit means on opposite sides of said orifice to close said control valve means in response to a pressure differential across said orifice caused by flow to said ratio change motor means connected to exhaust said fluid motor means to reduce the force of said spring to control said regulator valve means to reduce the regulated pressure from said high to said low pressure.

5. The invention defined in claim 4 and means to control the rate of change of pressure from said high to said low pressure.

6. The invention defined in claim 4 and means to control the rate of change of pressure from said low to said high pressure.

7. In a transmission, a control system for a multiratio power train, a source of fluid under pressure, regulator valve means having a spring to control the pressure of the fluid at said source, fluid motor means to vary the force of said spring to provide a regulator valve that controls the pressure of the fluid at a high pressure and at a low pressure, an orifice, ratio change control means, conduit means connecting said source through said orifice to said ratio change control means, ratio change motor means, means connecting said ratio change control means to said ratio change motor means, control valve means normally connecting said source to said fluid motor means to position said fluid motor for a spring force providing high pressure, said control valve means having opposed areas connected to said conduit means on opposite sides of said orifice to close said valve means in response to a pressure differential across said orifice caused by flow to said ratio change motor means connected to exhaust said fluid motor means to reduce the force of said spring to control said regulator valve means to reduce the regulated pressure from said high to said low pressure and orifice means in said control valve means to control the rate of change of pressure between said high pressure and said low pressure.

8. In a transmission, a control system for a multiratio power train, a source of fluid under pressure, regulator valve means having a spring to control the pressure of the fluid at said source, fluid motor means to vary the force of said spring to provide a regulator valve that controls the pressure of the fluid at a high pressure and at a low pressure, a first orifice, ratio change control means, conduit means connecting said source through said first orifice to said ratio change control means, ratio change motor means, means connecting said ratio change control means to said ratio change motor means, a second and third orifice, control valve means including a control valve normally connecting said source through said second orifice and through said control valve to said fluid motor means to position said fluid motor for a spring force providing a rate of change from low to high pressure controlled by said second orifice, said control valve having opposed areas connected to said conduit means on opposite sides of said first orifice to close said valve means in response to a pressure differential across said first orifice caused by flow to said ratio change motor means connected to exhaust said fluid motor means through said control valve and said third orifice to reduce the force of said spring to control said regulator valve means to reduce the regulated pressure from said high to said low pressure at a rate of change of pressure regulated by said third orifice.

9. In a transmission, a control system for a power train having a drive establishing friction device, a source of fluid under pressure, regulator valve means to control the pressure of the fluid at said source between and at a predetermined high pressure value and at a predetermined low pressure value, an orifice, a ratio change control means, said source being connected through said orifice to said ratio change control means, ratio change motor means operatively connected to said friction engaging device to establish said drive, means connecting said ratio change control means to said ratio change motor means, means responsive to flow through said orifice to said ratio change motor means operatively connected to said regulator valve means to change the pressure from one predetermined pressure value to the other for the entire duration of flow through said orifice, a first timing means to control the time rate of change of pressure from said high to said low pressure, and a second timing means to control the time rate of change of pressure from said low to said high pressure.

10. In a transmission, a control system for a power train having a drive establishing friction device, a source of fluid under pressure, regulator valve means to control the pressure of the fluid at said source between and at a predetermined high pressure value and at a predetermined low pressure value, an orifice, a ratio change control means, said source being connected through said orifice to said ratio change control means, ratio change motor means operatively connected to said friction engaging device to establish said drive, means connecting said ratio change control means to said ratio change motor means, means responsive to flow through said orifice to said ratio change motor means operatively connected to said regulator valve means to change the pressure from one predetermined value to the other for the entire duration of flow through said orifice, a first timing means to control the rate of change of pressure from said high to said low pressure, a second timing means to control the rate of change of pressure from said low to said high pressure, and said first and second timing means being operative to provide different rates of change.

11. In a transmission, a control system for a power train having a drive establishing friction engaging device movable from a disengaged position under a low force value to a contacting position for soft engagement and then under an increasing force value and finally a high force value to provide firmer engagement and finally a fully engaged position, a source of fluid under pressure, regulator valve means to control the pressure of the fluid at said source, an orifice, drive establishing control means, drive establishing motor means operatively connected to said friction engaging device to move said friction engaging device from said disengaged position into said contacting position under a low pressure value and then to said fully engaged position by a high pressure value, means connecting said source through said orifice and said control means to said motor means, and means responsive to a pressure differential across said orifice caused by flow to said motor means only during movement from said disengaged position to said contacting position connected to said regulator valve means to reduce the regulated pressure a predetermined constant degree regardless of variations in the operative rate of flow to a lower value sufficient to move said friction engaging device into soft engagement only during the movement of said friction engaging device from said disengaged position into said contacting position and immediately on contact to increase said regulated pressure to a high value to move said friction engaging device to said fully engaged position.

12. In a transmission, a control system for a power train having a drive establishing friction engaging device movable from a disengaged position under a low force value to a contacting position for soft engagement and then under an increasing force value and finally a high force value to provide firmer engagement and finally a fully engaged position, a source of fluid under pressure, a regulator valve including means to control the pressure of the fluid at said source at a high pressure and a lower pressure, an orifice, drive establishing control means, drive establishing motor means operatively connected to said friction engaging device to move said friction engaging device from said disengaged position into said contacting position by one of said pressures under a low force value and then to said fully engaged position by the other of said pressures under a high force value, means connecting said source through said orifice and said drive establishing control means to said drive establishing motor means, and means responsive to a pressure differential across said orifice caused by flow to actuate said motor means only during movement from said disengaged position to said contacting position connected to said means of said regulator valve to change the regulated pressure from one of said pressures to the other on the initiation of flow to actuate said motor means to move said friction engaging device from said disengaged position and to change said regulated pressure to said last mentioned one pressure on contact of the friction engaging device to move said motor means into firmer engagement and finally to said fully engaged position.

13. In a transmission, a control system for a power train having a drive establishing friction engaging device movable from a disengaged position under a low force value to a contacting position for soft engagement and then under an increasing force value and finally a high force value to provide firmer engagement and finally a fully engaged position, a source of fluid under pressure, a regulator valve including means to control the pressure of the fluid at said source at a high pressure and a lower pressure, an orifice, drive establishing control means, drive establishing motor means operatively connected to said friction engaging device to move said friction engaging device from said disengaged position into said contacting position by one of said pressures under a low force value and then to said fully engaged position by the other of said pressures under a high force value, means connecting said source through said orifice and said drive establishing control means to said drive establishing motor means, means responsive to a pressure differential across said orifice caused by flow to actuate said motor means only during movement from said disengaged position to said contacting position connected to said means of said regulator valve to change the regulated pressure from one of said pressures to the other on the initiation of flow to actuate said motor means to move said friction engaging device from said disengaged position and to change said regulated pressure to said last mentioned one pressure on contact of the friction engaging device to move said motor means into firmer engagement and finally to said fully engaged position, and said last mentioned means including means to change the pressure between the high and the low pressure at a time controlled slow rate of pressure change.

14. In a transmission, a control system for a power train having a drive establishing friction engaging device movable from a disengaged position under a low force value to a contacting position for soft engagement and then under an increasing force value and finally a high force value to provide firmer engagement and finally a fully engaged position, a source of fluid under pressure, a regulator valve including means to control the pressure of the fluid at said source at a predetermined high pressure value and a predetermined low pressure value, an orifice, drive establishing control means, drive establishing motor means operatively connected to said friction engaging device to move said friction engaging device from said disengaged position into said contacting position by one of said pressure values under a low force value and then to said fully engaged position by the other of said pressure values under a high force value, means connecting said source through said orifice and said drive establishing control means to said drive establishing motor means, and means responsive to a pressure differential across said orifice caused by flow to actuate said motor means only during movement from said disengaged position to said contacting position connected to said means of said regulator valve to change the regulated pressure from one of said pressure values to the other on the initiation of flow to actuate said motor means to move said friction engaging device from said disengaged position and to change said regulated pressure to said last mentioned one pressure value on contact of the friction engaging device to move said motor means into firmer engagement and finally to said fully engaged position.

15. In a transmission, a control system for a power train having a drive establishing friction engaging device movable from a disengaged position under a low force value to a contacting position for soft engagement and then under an increasing force value and finally a high force value to provide firmer engagement and finally a fully engaged position, a source of fluid under pressure, a regulator valve including means to control the pressure of the fluid at said source at a predetermined high pressure value and a predetermined low pressure value, an orifice, drive establishing control means, drive establishing motor means operatively connected to said friction engaging device to move said friction engaging device from said disengaged position into said contacting position by one of said pressure values under a low force value and then to said fully engaged position by the other of said pressure values under a high force value, means connecting said source through said orifice and said control means to said motor means, and means responsive to a pressure differential across said orifice caused by flow to actuate said motor means only during movement from said disengaged position to said contacting position connected to said means of said regulator valve to change the regulated pressure from one of said pressure values to the other on the initiation of flow to actuate said motor means to move said friction engaging device from said disengaged position and to maintain said pressure at said other value only during the movement of said friction engaging device into said contacting position and to change said regulated pressure to said last mentioned one pressure value on contact of the friction engaging device to move said motor means into firmer engagement and finally to said fully engaged position.

16. In a transmission, a control system for a power train having a drive establishing friction engaging device movable from a disengaged position under a low force value to a contacting position for soft engagement and then under an increasing force value and finally a high force value to provide firmer engagement and finally a fully engaged position, a source of fluid under pressure, a regulator valve including means to control the pressure of the fluid at said source at a predetermined high pressure value and a predetermined low pressure value, an orifice, drive establishing control means, drive establishing motor means operatively connected to said friction engaging device to move said friction engaging device from said disengaged position into said contacting position by one of said pressure values under a low force value and then to said fully engaged position by the other of said pressure values under a high force value, means connecting said source through said orifice and said control means to said motor means, and means responsive to a pressure differential across said orifice caused by flow to actuate said motor means only during movement from said disengaged position to said contacting position connected to said means of said regulator valve to change the regulated pressure from one of said pressure values to the other on the initiation of flow to actuate said motor means to move said friction engaging device from said disengaged position and to maintain said pressure at said other value only during the movement of said friction engaging device into said contacting position and to change said regulated pressure to said last mentioned one pressure value at a time controlled slow rate of pressure change on contact of the friction engaging device to move said motor means into firmer engagement and finally to said fully engaged position.

17. In a transmission, a control system for a power train having a drive establishing friction engaging device movable from a disengaged position under a low force value to a contacting position for soft engagement and then under an increasing force value and finally a high force value to provide firmer engagement and finally a fully engaged position, a source of fluid under pressure, a regulator valve including means to control the pressure of the fluid of said source at a predetermined high pressure value and at a predetermined low pressure value, an orifice, drive establishing control means, drive establishing motor means operatively connected to said friction engaging device to move said friction engaging device from said disengaged position into said contacting position under said low pressure value to provide soft clutch engagement and then to said fully engaged position under said high pressure value to provide full non-slipping drive engagement, means connecting said source through said orifice and said control means to said motor means, and means normally acting on said means of said regulator valve to control the pressure of the fluid at said source at said predetermined high pressure value and being responsive to a pressure differential across said orifice caused by any flow operative to move said motor means only from said disengaged position to said contacting position to act on said means of said regulator valve to reduce and maintain the regulated pressure at said predetermined low pressure value only during the movement of said friction engaging device from said disengaged position into said contacting position under said low pressure value providing soft engagement of said friction engaging device and immediately on contact to increase said regulated pressure to said predetermined high pressure value to move said motor means under a pressure increasing to said high pressure value to provide firmer engagement and then full engagement of said friction engaging device.

18. In a transmission, a control system for a power train having a drive establishing friction engaging device movable from a disengaged position under a low force value to a contacting position for soft engagement and then under an increasing force value and finally a high force value to provide firmer engagement and finally a fully engaged position, fluid motor means operatively connected to said friction engaging device operative to move from a disengaged position to a contacting position under one pressure with a low force and then to a fully engaged position under another pressure with a high force to similarly actuate said friction engaging device, a source of fluid under pressure, a regulator valve including means to control the pressure of the fluid of said source at a high pressure value and at a lower pressure value, drive control means including a passage connecting said regulated source of fluid under pressure to said fluid motor means to control the flow of fluid between said source and said fluid motor means, said drive control means being operative to control the flow of fluid between said source and said fluid motor means to engage and disengage said drive in response to the flow of fluid, flow detecting means located in said passage effective upon detecting the operative degree of flow of fluid between said control means and said fluid motor means effective to move the fluid motor means only from said disengaged position to said contacting position to provide a signal and to discontinue said signal with the substantial cessation of flow when said fluid motor means reaches said contacting position and pressure control means responsive to said signal and operative on said means of said regulator valve to change the regulated pressure from one to another of said pressure values during only said operative degree of flow effective during movement from said disengaged position to said contacting position to provide soft initial engagement of said friction engaging device and on the cessation of said signal at said contacting position to change the regulated pressure from said another to said last mentioned one pressure value to move said friction engaging device to said fully engaged position to provide firmer and then full engagement.

19. The invention defined in claim 18 and said pressure control means controlling the change in regulated pressure in at least one direction at a time controlled slow rate of pressure change.

20. In a transmission, a control system for a power train having a drive establishing friction engaging device movable from a disengaged position under a low force value to a contacting position for soft engagement and then under an increasing force value and finally a high force value to provide firmer engagement and finally a fully engaged position, fluid motor means operatively connected to said friction engaging device and operative to move from a disengaged position in which said friction engaging device is in said disengaged position to a contacting position in which said friction engaging device is in said contacting position under one pressure with a low force value and to a fully engaged position in which said friction engaging device is in said fully engaged position under another pressure with a high force value to fully engage said friction engaging device to establish said drive, a source of fluid under pressure, a regulator valve including means to control the pressure of the fluid of said source at a high pressure value and at a low pressure value, both values being predetermined by said regulator valve, control means including a passage connecting said regulated source of fluid under pressure to said fluid motor means to control the flow of fluid between said source and said fluid motor means, said control means being operative to control the flow of fluid between said source and said fluid motor means to engage and disengage said drive in response to the flow of fluid, flow detecting means located in said passage effective upon detecting any operative degree of flow of fluid through said control means to said motor means effective to move said fluid motor means only from said disengaged position to said contacting position to provide a signal and to discontinue said signal with the substantial cessation of flow during movement from said motor means from said contacting position to said fully engaged position and means responsive to said signal and operative on said regulator valve to change the regulated pressure from one to another of said predetermined pressure values to actuate said fluid motor means under a low force value to provide soft engagement of said friction engaging device during the initiation of any operative degree of flow indicating initiation of movement of said motor from said disengaged position and to maintain said pressure at said another predetermined pressure value during the entire period of said operative degree of flow only from said disengaged position to said contacting position and on the cessation of flow when said motor reaches said contacting position and said signal indicates contact of said friction engaging device to initiate a change of the regulated pressure from said another to said one pressure value to actuate said fluid motor means under a high force value to move said friction engaging device to said fully engaged position to provide firmer and then full engagement.

21. In a transmission, a control system for a power train having a drive establishing friction engaging device movable from a disengaged position under a low force value to a contacting position for soft engagement and then under an increasing force value and finally a high force value to provide firmer engagement and finally a fully engaged position, fluid motor means operative to engage said friction engaging device with a force proportional to the fluid pressure to establish said drive, a source of fluid under pressure, a regulator valve including means to control the pressure of the fluid of said source at a high pressure value and at a low pressure value, both values being predetermined by said regulator valve, control means including a passage connecting said regulated source of fluid under pressure to said motor means to control the flow of fluid from said source to said motor means, said control means being operative to control the flow of fluid from said source to said motor means to engage said drive in response to the flow of fluid, flow detecting means located in said passage effective upon detecting any operative degree of flow of fluid through said control means to said fluid motor means only in a direction to said motor means sufficient to move said motor means only from said disengaged position to said contacting position to provide a signal and to discontinue said signal with the cessation of said flow to said fluid motor means when said motor reaches said contacting position and means responsive to said signal and operative on said regulator valve to change the regulated pressure from said high to said low predetermined pressure value during any operative degree of flow to provide soft engagement of said friction engaging device and on the cessation of said signal to change the regulated pressure from said low to said high predetermined pressure value to move said friction engaging device to said fully engaged position to provide firmer and then full engagement.

22. In a transmission, a fluid operated drive engaging device having an expansible chamber which expands to actuate said device, a source of fluid under pressure, supply line means connecting said source to said chamber having a pressure value the same under static conditions and proportional under flow conditions to the pressure value in said chamber, control valve means to control the supply of fluid from said source through said supply line means to said chamber, pressure regulating valve means having a movable element and biasing means, means to connect said supply line means to said pressure regulating valve to supply fluid to urge said movable element to move in one direction, said biasing means providing a biasing force to urge said movable element to move in the opposite direction controllable to provide a predetermined high-biasing force and a predetermined low biasing force, said regulating valve having vent means operative in response to movement of said movable element in said one direction by said fluid from said supply line means to vent said supply line means and to movement in said opposite direction by said biasing force to close said vent means to regulate the fluid pressure in said supply line and said chamber at and between predetermined high and low pressure values, and means responsive to the supply of fluid from said source through said supply line means to said chamber by said control valve means to change the biasing force from one to another predetermined biasing force to actuate said regulator valve means to change from one to another predetermined regulated pressure and responsive to a fluid pressure in said supply line proportional to said regulated fluid pressure regulated by said regulator valve operatively connected to said biasing means to provide a continuous, gradual slope change of said biasing force between said low biasing force and said high biasing force at a predetermined controlled slow rate of change over an extended period of time to change the fluid pressure in said supply line means and said chamber between said low value and said high pressure value at a gradual slope rate of pressure change regulated by said regulator valve means over said extended period of time to gradually and softly engage said drive engaging device.

23. In a transmission, a fluid operated drive engaging device having an expansible chamber which is supplied with fluid to expand said chamber to engage said drive, a source of fluid under pressure, supply line means connecting said source to said chamber having a pressure value the same under static conditions and proportional under flow conditions to the pressure value in said chamber control valve means to control the supply of fluid from said source through said supply line means to said chamber, pressure regulating valve means having a movable element and biasing means, means to connect said supply line means to said pressure regulating valve to supply fluid to urge said movable element to move in one direction, said biasing means providing a biasing force to urge said movable element to move in the opposite direction having a predetermined normal high biasing force and controllable to reduce the biasing force to a predetermined low biasing force, said regulating valve having vent means operative in response to movement of said movable element in said one direction by said fluid from said supply line means to vent said supply line means and to movement in said opposite direction by said biasing force to close said vent means to normally regulate the fluid pressure in said supply line and said chamber at and between predetermined high and low pressure values, and means responsive to the supply of fluid from said source through said supply line means to said device by said control valve means to provide initially said predetermined low biasing force to actuate said regulator valve means to provide a predetermined low regulated pressure and responsive to a fluid pressure in said supply line proportional to said regulated fluid pressure regulated by said regulator valve operatively connected to said biasing means to provide a continuous, gradual slope increase of said biasing force from said low biasing force to said normal high biasing force at a predetermined controlled slow rate of change over an extended period of time to increase the fluid pressure in said supply line means and said device from said low initial value at a gradual slope rate of pressure increase to said high pressure value regulated by said regulator valve means over said extended period of time to gradually and softly engage said drive engaging device.

24. In a transmission, a fluid operated drive engaging device having an expansible chamber which expands to actuate said device, a source of fluid under pressure, supply line means connecting said source to said chamber having a pressure value the same under static conditions and proportional under flow conditions to the pressure value in said chamber, control valve means to control the supply of fluid from said source through said supply line means to said chamber, pressure regulating valve means having a movable element and biasing means, means to connect said supply line means to said pressure regulating valve to supply fluid to urge said movable element to move in one direction, said biasing means providing a biasing force to urge said movable element to move in the opposite direction controllable to provide a predetermined high biasing force and a predetermined low biasing force, said regulating valve having vent means operative in response to movement of said movable element in said one direction by said fluid from said supply line means to vent said supply line means and to movement in said opposite direction by said biasing force to close said vent means to regulate the fluid pressure in said supply line and said chamber at and between predetermined high and low pressure values, and flow detecting means responsive to the flow of fluid from said source through said supply line means to said chamber by said control valve means to control said biasing means to change the biasing force from one to another predetermined biasing force to actuate said regulator valve means to change from one to another predetermined regulated pressure and responsive to a fluid pressure in said supply line proportional to said regulated fluid pressure regulated by said regulator valve operatively connected to said biasing means to provide a continuous, gradual slope change of said biasing force between said low biasing force and said high biasing force at a predetermined controlled slow rate of change over an extended period of time to change the fluid pressure in said supply line means and said chamber between said low value and said high pressure value at a gradual slope rate of pressure change regulated by said regulator valve means over said extended period of time to gradually and softly engage said drive engaging device.

25. In a transmission, a fluid operated drive engaging device having an expandable chamber which is supplied with fluid to expand said chamber to engage said drive, a source of fluid under pressure, supply line means connecting said source to said chamber having a pressure value the same under static conditions and proportional under flow conditions to the pressure value in said chamber, control valve means to control the flow of fluid from said source through said supply line means to said chamber, pressure regulating valve means having a movable element and biasing means, means to connect said supply line means to said pressure regulating valve to supply fluid to urge said movable element to move in one direction, said biasing means providing a biasing force to urge said movable element to move in the opposite direction having a predetermined normal high biasing force and controllable to reduce the biasing force to a predetermined low biasing force, said regulating valve having vent means operative in response to movement of said movable element in said one direction by said fluid from said supply line means to vent said supply line means and to movement in said opposite direction by said biasing force to close said vent means to normally regulate the fluid pressure in said supply line and said device at and between a predetermined high to low pressure value, and flow detecting means responsive to the flow of fluid from said source through said supply line means to said chamber by said control valve means to control said biasing means to provide initially and for the duration of flow said predetermined low biasing force to actuate said regulator valve means to provide a predetermined low regulated pressure and responsive to a fluid pressure in said supply line proportional to said regulated fluid pressure regulated by said regulator valve operatively connected to said biasing means to provide a continuous, gradual slope increase of said biasing force from said low biasing force to said normal high biasing force at a predetermined controlled slow rate of change over an extended period of time to increase the fluid pressure in said supply line means and said chamber from said low initial value at a gradual slope rate of pressure increase to said high pressure value regulated by said regulator valve means over said extended period of time to gradually and softly engage said drive engaging device.

26. In a transmission, a fluid operated drive engaging device, a source of fluid under pressure, supply line means connecting said source to said device having a pressure value the same under static conditions and proportional under flow conditions to the pressure value in said device, control valve means in said supply line means to control the supply of fluid from said source through said supply line means to said device to cause on the initiation of the supply of pressure fluid to said device, a pressure drop in said supply line means, pressure regulating valve means having a movable element and biasing means, means to connect said supply line means to said pressure regulating valve to supply fluid to urge said movable element to move in one direction, biasing means providing a biasing force to urge said movable element to move in the opposite direction having a predetermined high biasing force and a predetermined low biasing force, said regulating valve having vent means connected to said supply line means both upstream and downstream of said regulator valve operative in response to movement of said movable element in said one direction by said fluid from said supply line means to vent said supply line means both upstream and downstream of said regulator valve and to movement in said opposite direction by said biasing force to close said vent means to regulate the fluid pressure in said entire supply line and said device at and between predetermined high and low pressure values, and means responsive to the supply of fluid from said source through said supply line means to said device by said control valve means to change said biasing force from one to another of said predetermined biasing forces to actuate said regulator valve means to change from one to another predetermined regulated pressure and responsive to a fluid pressure in said supply line proportional to said regulated fluid pressure regulated by said regulator valve operatively connected to said biasing means to provide a continuous, gradual slope change of said biasing force from one to another biasing force at a controlled predetermined slow rate of change over an extended period of time to control said regulator valve to provide initially one predetermined pressure value and then to change the fluid pressure in said supply line means and said device from said one pressure at a gradual predetermined slope rate of pressure increase to said another pressure of said regulator valve means over said extended period of time to gradually and softly engage said drive engaging device.

27. In a transmission, a fluid operated drive engaging device operative on the supply of fluid to said device to engage a drive, a source of fluid under pressure, supply line means connecting said source to said device having a pressure value the same under static conditions and proportional under flow conditions to the pressure value in said device, control valve means in said supply line means to control the supply of fluid from said source through said supply line means to said device to cause on the initiation of the supply of pressure fluid to said device, a pressure drop in said supply line means, pressure regulating valve means having a movable element, means to connect said supply line means to said pressure regulating valve to supply fluid to urge said movable element to move in one direction, biasing means providing a biasing force to urge said movable element to move in the opposite direction having a predetermined normal high biasing force and controllable to reduce the biasing force to a predetermined low biasing force, said regulating valve having vent means connected to said supply line means both upstream and downstream of said regulator valve operative in response to movement of said movable element in said one direction by said fluid from said supply line means to vent said supply line means both upstream and downstream of said regulator valve and to movement in said opposite direction by said biasing force to close said vent means to regulate the fluid pressure in said entire supply line and said device at and between a predetermined high and low pressure value, and means responsive to the supply of fluid from said source through said supply line means to said device by said control valve means to provide initially said predetermined low biasing force to actuate said regulator valve means to provide a predetermined low regulated pressure and responsive to a fluid pressure in said supply line proportional to said regulated fluid pressure regulated by said regulator valve operatively connected to said biasing means to provide a continuous, gradual slope increase of said biasing force from said low to said normal biasing force at a controlled predetermined slow rate of change over an extended period of time to control said regulator valve to provide initially said predetermined positive low pressure value and then to increase the fluid pressure in said supply line means and said device from said low initial value at a gradual predetermined slope rate of pressure increase to said high regulated pressure of said regulator valve means over said extended period of time to gradually and softly engage said drive engaging device.

28. In a transmission, a control system for a power train having a drive establishing friction engaging device movable from a disengaged position under a low force value and under an increasing force value to provide soft engagement during the initial stages of engagement and finally a high force value to provide full engagement in the fully engaged position, a source of fluid under pressure, regulator valve means including pressure control means to control the pressure of the fluid at said source at and between a predetermined high pressure value and a predetermined low pressure value, drive establishing control means, drive establishing motor means operatively connected to said friction engaging device to move said friction engaging device from said disengaged position by one of said pressure values under a low force value and then through the engagement stages under a varying pressure to provide an increasing force value and to said fully engaged position by the other of said pressure values under a high force value, connecting means connecting said source through said drive establishing control means to said drive establishing motor means and having a point having a pressure proportional to the pressure in said drive establishing motor means, and means to connect said point of said connecting means to said pressure control means to supply said pressure proportional to said pressure in said motor means to said pressure control means of said regulator valve to change the regulated pressure from one of said pressure values to the other at a predetermined timed rate of pressure change controlled by the pressure supplied to said motor means to gradually increase the force value of said motor means actuating said friction engaging device at a predetermined timed rate over an extended period of time to provide initial soft engagement and final firm engagement.

29. In a transmission, a control system for a power train having a drive establishing friction engaging device movable from a disengaged position under a low force value and under an increasing force value to provide soft engagement during the initial stages of engagement and finally a high force value to provide full engagement in the fully engaged position, a source of fluid under pressure, regulator valve means including pressure control means to control the pressure of the fluid at said source at and between a predetermined high pressure value and a predetermined low pressure value, drive establishing control means, drive establishing motor means operatively connected to said friction engaging device to move said friction engaging device from said disengaged position by one of said pressure values under a low force value and then through the engagement stages under a varying pressure to provide an increasing force value and to said fully engaged position by the other of said pressure values under a high force value, connecting means connecting said source through said drive establishing control means to said drive establishing motor means and having a point having a pressure proportional to the pressure in said drive establishing motor means, and means responsive to flow to actuate said motor means to connect said point of said connecting means to said pressure control means to supply said pressure proportional to said pressure in said motor means to said pressure control means of said regulator valve to change the regulated pressure from one of said pressure values to the other at a predetermined timed rate of pressure change controlled by the pressure supplied to said motor means to gradually increase the force value of said motor means actuating said friction engaging device at a predetermined timed rate over an extended period of time to provide initial soft engagement and final firm engagement.

References Cited in the file of this patent
UNITED STATES PATENTS

| | | |
|---|---|---|
| 2,568,528 | Welte | Sept. 18, 1951 |
| 2,711,656 | Swirl | June 28, 1955 |
| 2,720,124 | Polomski | Oct. 11, 1955 |
| 2,807,968 | Foster | Oct. 1, 1957 |